United States Patent [19]

Jaye et al.

[11] 3,800,278

[45] Mar. 26, 1974

[54] BRAKE LINING WEAR WARNING GAUGE

[76] Inventors: Sam Jaye, 16 Meadowgreen Ct., Santa Rosa, Calif. 95405; Jon D. Erickson, 234 "A" St., South San Francisco, Calif. 94080

[22] Filed: Aug. 22, 1972

[21] Appl. No.: 282,665

[52] U.S. Cl............... 340/52 A, 188/1 A, 200/61.4, 200/61.44
[51] Int. Cl........................................... B60t 17/22
[58] Field of Search.................. 340/52 A, 52 B, 69; 200/61.41, 61.4, 61.44; 188/1 A; 339/10

[56] References Cited
UNITED STATES PATENTS

| | | | |
|---|---|---|---|
| 2,731,619 | 1/1956 | Fratus................................ | 340/52 A |
| 3,130,269 | 4/1964 | Rountree............................ | 339/10 |
| 3,297,985 | 1/1967 | Trebonsky et al................. | 340/52 A |
| 3,456,236 | 7/1969 | Labartino et al.................. | 340/52 A |
| 3,716,832 | 2/1973 | Gorgie et al...................... | 340/52 A |
| 3,716,831 | 2/1973 | Rikard et al...................... | 340/52 A |

Primary Examiner—Donald J. Yusko
Assistant Examiner—Joseph E. Nowicki
Attorney, Agent, or Firm—Clarence A. O'Brien; Harvey B. Jacobson

[57] ABSTRACT

A device for warning an operator of a brake-equipped vehicle that the brake linings have become worn to a degree that they should be replaced. The device includes a novel and unique contact arrangement incorporated into the brake assembly which will complete an electric circuit to a flashing warning light when the ignition system is in the "on" position and the brake pedal depressed with the circuit including a relay for maintaining the warning light activated until the ignition switch is moved to the "off" position.

8 Claims, 3 Drawing Figures

BRAKE LINING WEAR WARNING GAUGE

BACKGROUND OF THE INVENTION

1. Field of the Invention

The present invention generally relates to a brake lining wear warning gauge and more particularly a gauge incorporated into the brake lining and brake shoe which will contact the surface of the brake drum or other moving surface which the brake shoe lining engages for completing an electrical circuit to a warning device.

2. Description of the Prior Art

Various endeavors have been made to warn the operators of motor vehicles or other brake-equipped vehicles of excessive wear occurring in the brake linings so that the brake linings may be replaced so that the vehicle may be more safely operated and so that the surface of the brake drum will not be damaged or scored by metallic components of the brake shoe coming into contact therewith. Exemplary patents relating to this type of structure are as follows:

| Schweikle | 2,146,357 | Feb. 7, 1939 |
| Fratus | 2,731,619 | Jan. 17, 1956 |
| Rizzo et al. | 2,981,929 | Apr. 25, 1961 |
| Bezemek | 3,271,737 | Sept. 6, 1966 |
| Phillips | 3,440,604 | Apr. 22, 1969 |
| Labartino et al. | 3,456,236 | July 15, 1969 |
| Rike et al. | 3,553,642 | Jan. 5, 1971 |
| Maras | 3,553,643 | Jan. 5, 1971 |
| Fiorita | 3,605,085 | Sept. 14, 1971 |

While the above-mentioned patents disclose various arrangements for warning vehicle operators of the condition of the brake linings, such devices, for various reasons, have not been adopted for use in motor vehicles.

SUMMARY OF THE INVENTION

An object of the present invention is to provide a brake lining wear warning gauge that is simple in construction, easy to install, foolproof but yet effective in operation.

Another object of the invention is to provide a warning gauge in accordance with the preceding object in which standard and easily accessible and relatively inexpensive components are employed including electrical probes incorporated into the brake linings which are quite stable and rigid but will not score the brake drums or rotors when engaging the same with the probes being capable of insertion to any desired depth in relation to the brake lining.

Still another object of the invention is to provide a wear warning gauge incorporating an effective warning signal to gain the attention of the motor vehicle operator by employing a flashing light mounted on the dashboard or other similar area within the vehicle with the light being associated with an electrical circuit which also includes the probes with the electrical circuit being energized by the ignition switch of the vehicle and once the warning light has been activated by depressing the brake pedal and by the probe engaging the brake drum or rotor, the flashing warning light will be retained in operative or flashing condition until the ignition switch is moved to the "off" position thus assuring that the operator's attention will be directed to the condition indicated by the warning light.

Yet another important object of the invention is to provide a brake lining wear warning gauge incorporating standard over-the-counter components with the device being flexible in installation to enable individual warning devices associated with the wheels of a vehicle to be plugged in or disconnected when desired.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
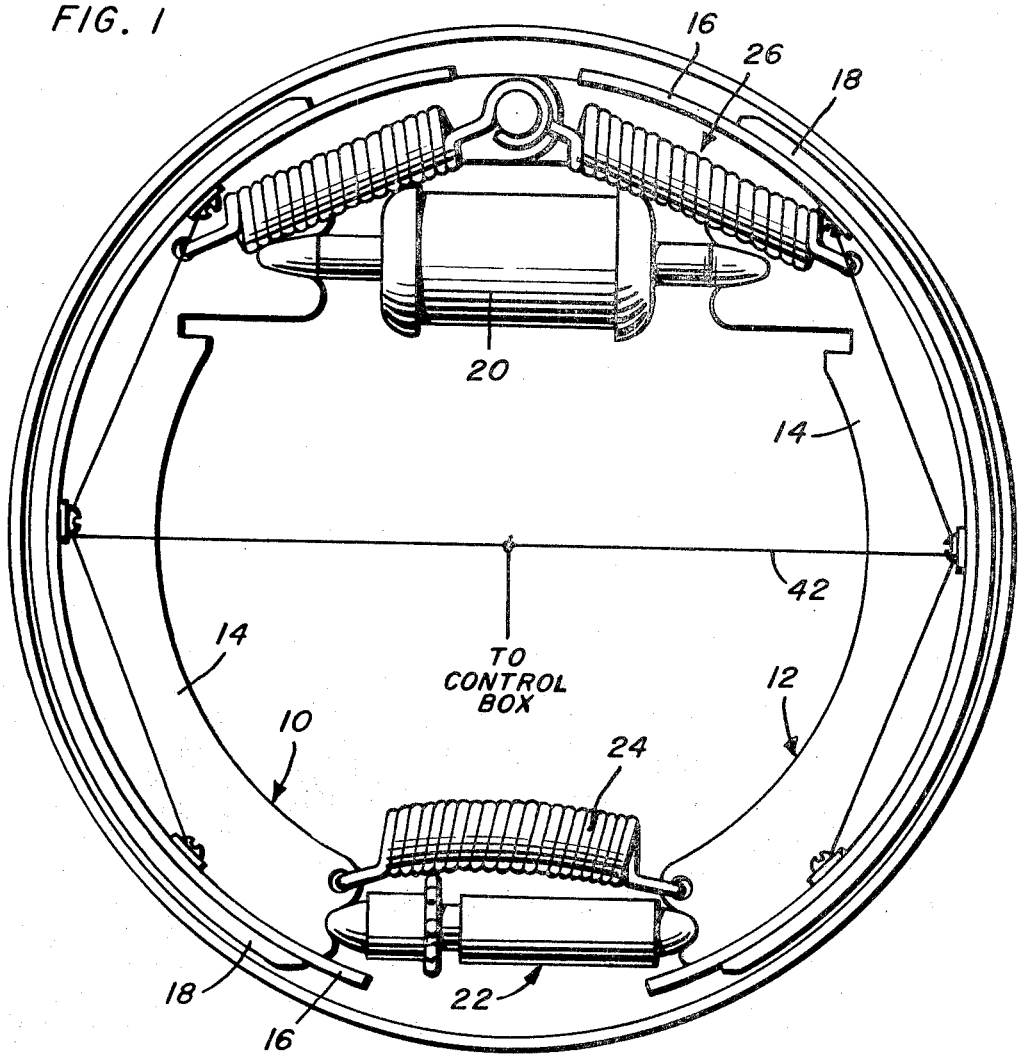
FIG. 1 is a view of a brake shoe and lining assembly illustrating schematically the incorporation of the wear warning probe assembly incorporated therein.

Referring now specifically to the drawings, FIG. 1 illustrates a conventional brake assembly including a pair of brake shoes 10 and 12 of conventional construction each of which is conventionally T-shaped in configuration and including a radially inwardly disposed flange 14 and a peripheral transverse flange 16 on which a brake lining 18 is attached either by rivets, bonding or any other conventional attaching means. FIG. 1 also illustrates associated conventional construction including a hydraulic cylinder assembly 20 for actuating the brake shoe 10 and 12, an adjustment mechanism 22 which may be automatically adjusted to properly orient the brake shoes so that the linings will engage the interior of the brake drum (not shown). Return springs 24 and 26 are provided for retaining the brake shoes in their retracted position with all of the aforementioned components being completely conventional and while the wear warning gauge of the present invention has been illustrated in association with a conventional brake shoe arrangement which expands outwardly into frictional braking contact with a brake drum, it is pointed out that the structure may be employed with disc-type brakes where the pad or shoe is moved into engagement with a disc or rotor or in combination with any type of brake structure in which a brake lining is moved into contact with a moving surface for frictional braking contact therewith.

Figure 2:
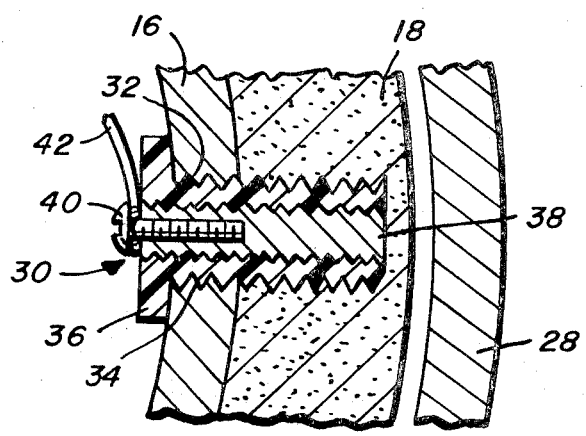
FIG. 2 is a sectional view, on an enlarged scale, of one of the probes illustrating the specific construction thereof and the association thereof with the brake lining after the lining has worn to a degree that the operator will be warned of the worn condition.

FIG. 2 illustrates the association of the brake lining 18 and the brake drum designated at 28 in which the brake lining 18 will move outwardly into engagement with the brake drum 28 in a conventional manner and as long as the brake lining 18 has not worn to a predetermined degree, the wear warning gauge of the present invention will not be actuated. However, after the brake lining 18 has worn to a predetermined degree, an electric probe assembly generally designated by the numeral 30 will contact the brake drum surface for completing an electrical circuit in a manner described hereinafter. The electric probe 30 includes an internally threaded bore 32 formed in the flange 16 of the brake shoe. Threaded through the internally threaded hole 32 is a tubular sleeve 34 that is externally threaded for threaded engagement with the hole 32 and which is also internally threaded and provided with a flange 36 on its inner end for limiting the insertion of the sleeve 34 into the hole 32 with the outer end portion of the sleeve being threaded into a bore formed in the lining 18. The sleeve 34 is in the form of a molded tubular body of plastic material such as nylon or the like and is generally referred to as a "banana jack" and is a commercially available product in the electronics industry. The interior of the sleeve 34 which is internally threaded is then filled with ordinary solder 38 which terminates flush with both ends of the tubular sleeve 34 and which is rigidly maintained in the interior of the sleeve 34 by the internal threads thereon with the solder, when in flowable state, conforming with and engaging the threads so that when the solder hardens, it will be fixedly and rigidly secured in position. A screw fastener 40 is threaded into the inner end of the solder 38 for connection with an electrical conductor 42. The screw 40 may be inserted into the solder by drilling and tapping the hardened solder in a conventional manner to take a relatively small machine screw so that the insulated conductor 42 may be firmly and rigidly fixed to the solder 38.

As illustrated, each brake shoe 10 and 12 is provided with three electric probes and these probes are all interconnected by the electrical conductors 42 being connected to a single conductor extending to a control box generally designated by numeral 44. As illustrated, the screw 40 goes only into the brake shoe and does not extend into the lining so that there is no possibility of the screw engaging the brake drum or rotor. The three probes generally at the center and at each end of each brake shoe will assure that all areas of the lining which are subject to wear will be gauged by the probes and the solder, being relatively soft conductive metal will not score the interior of the brake drum 28 and, of course, the nylon tubular body 34 will not score the brake drum 28 but yet the solder will provide an effective electrical circuit between the conductor 42 and the brake drum 28 when the brake lining 18 has worn to a degree that the outer end of the probe 30 will come into contact with the brake drum.

Figure 3:
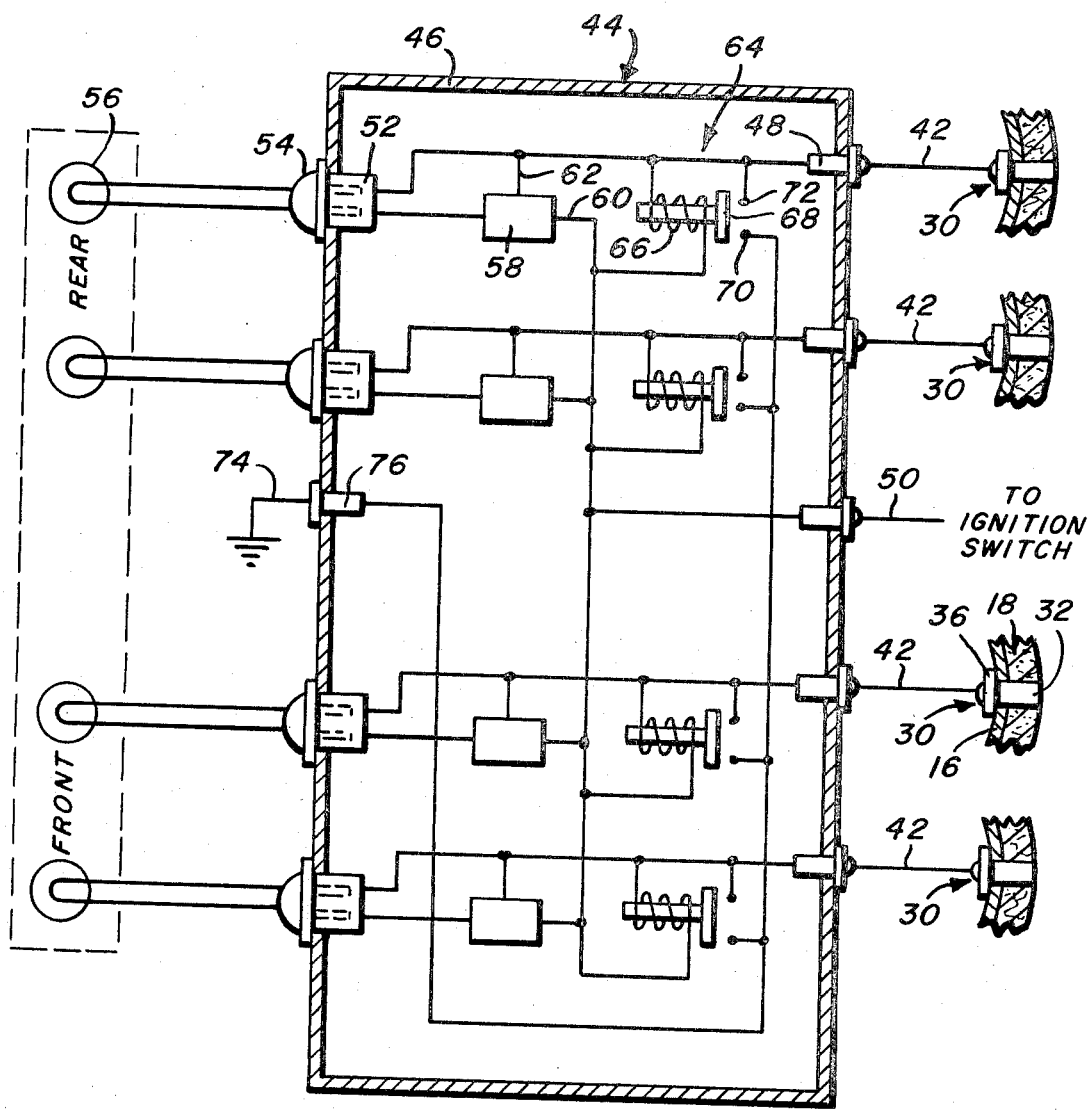
FIG. 3 is a schematic illustration of the warning gauge illustrating the electrical circuitry involved.

The control box 44 illustrated in FIG. 3 includes a housing 46 of any suitable construction mounted in any particular desired location such as behind the dashboard, on the fire wall or other location within the vehicle. Each wheel assembly of a vehicle is electrically connected to the control box by the electrical conductors 42. In FIG. 3, four wheel assemblies are schematically illustrated but any number of wheels may be involved with a warning gauge incorporated into each wheel brake assembly. The electrical conductors 42 extend into the housing or box 46 through insulated tubular members 48 in the form of "banana jacks" and an electrical supply conductor 50 extends into the box 46 through a similar insulated sleeve with the electrical conductor 50 being connected with the ignition switch of the vehicle so that electrical energy is supplied to the warning gauge when the ignition switch is in the "on" position and the warning gauge will be deenergized when the ignition switch is moved to the "off" position.

The housing 46 is provided with a plurality of female plugs 52 which correspond in number with the number of brake assemblies on the vehicle with each of the female plugs detachably receiving a male plug 54 that is electrically connected with a warning light 56 which may be oriented in any desired position on the dashboard or in any other suitable area to enable observation thereof by the operator of the vehicle. This arrangement enables the lights 56 to be disconnected so that in the event one of the lights is activated due to wear on the brake lining on a particular wheel assembly of a vehicle, the operator of the vehicle may disconnect the light to avoid continuous flashing of the light and the distraction that would be caused thereby. With the operator making an appropriate notation that the brake assembly on the particular wheel involved should be repaired by replacing the lining. Also, by providing a similar plug connector for the conductors 42, the control box may be arranged in a manner so that any number of wheel probe units may be incorporated therein along with any number of light units to enable a modular concept to be incorporated into the device so that the unit may be installed in vehicles having different numbers of brake assemblies with a suitable color code being employed to make certain that the appropriate lights 56 have been connected with the appropriate brake assemblies on the different wheels.

Each light 56 is provided with a flasher unit 58 which is metal cased and is provided with a positive battery terminal or connection 60 and a ground terminal or connection 62. Also, each light 56 and flasher unit 58 is provided with a holding relay or coil 64 which includes a coil 66 which, when energized, will move a bridging member 68 into bridging contact with electric contact points 70 and 72 for maintaining the circuit through the flasher unit 58 after the circuit has been established when the probe 30 comes into contact with the brake drum 28 when the brake pedal is depressed and the ignition switch is in the "on" position. The control box 44 is also provided with a ground wire 74 which extends through an insulating sleeve 76 and which is electrically connected with the positive terminals of the flasher units and the coil 66 to complete the circuits therethrough when the circuit with the electrical conductor 42 is completed. While the relay 64 has been illustrated with the core thereof making physical engagement with the contacts, this is schematically shown with the relay and its association with the contacts which it is to close and hold closed being completely conventional in construction and operation. Thus, with the ignition switch in the "on" position and the vehicle operating normally and the brake pedal is depressed, if the lining 18 has worn to a degree that the solder 38 comes into contact with the drum 28, the electrical circuit will be completed through the relay and flasher unit and the appropriate light 56 will be operated in a flashing manner to draw the attention of the vehicle operator to the warning light and warn the operator of the worn condition of the brake linings in that particular wheel. The operator of the vehicle may let the light 56 continue to operate or he may merely pull the plug 54 with the relay 64 continuing to maintain the flasher and light energized until the ignition switch is moved to the "off" position.

No special tooling is required in constructing this device since the components are easily secured from commercial sources and with the gauge of the present invention incorporated into the brake assemblies, the vehicle operator may not only determine the condition of his brake linings but also eliminate unnecessary brake relining jobs which frequently are caused by repair shop operators advising vehicle owners that the brakes need relining when in actuality they do not need relining. With the device being energized with the ignition system, there is complete elimination of possible battery discharge. Additionally, there can be no scoring or damage of brake drums or rotors because of the structure of the probes in which the conductive metal to complete the electrical circuit for actuating the warning light is of relatively soft metal which will not score or damage the brake drum or rotor.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In a brake assembly, a brake lining wear warning gauge to indicate when the brake lining is worn to a degree requiring replacement comprising a probe embedded in the brake lining inwardly of the friction surface thereof with the brake lining normally insulating the probe from a braking surface which the lining normally engages for imparting a braking force thereto, an electrical circuit including a warning device associated with the probe and a braking surface for energizing the warning device when the brake linings are worn to a degree exposing the probe to the braking surface, said probe being constructed of conductive material which is relatively soft to eliminate scoring damage to the braking surface when in contact therewith, said brake lining being mounted on a shoe of rigid material, said probe including a tubular insulating sleeve extending through and removably secured to a corresponding internally threaded hole in the shoe and received in a corresponding recess in the brake lining, said sleeve terminating in inwardly spaced relation to the external friction surface of the brake lining when the brake lining is in a relatively new condition, said conductive material being disposed interiorly of the tubular sleeve and having the end portions thereof corresponding with the end portions of the tubular sleeve, said tubular sleeve having internal projections securely locking the conductive material to the tubular sleeve with the conductive material being hardenable and being flowed into the tubular sleeve when in flowable condition and then hardening and becoming integral with the tubular sleeve thereby providing a probe of unitary construction.

2. The structure as defined in claim 1 wherein an electrical conductor is connected with the inner end of the conductive material, a screw-threaded fastener extending into the conductive material a distance less than the length of the probe to assure that the fastener will not engage the braking surface.

3. The structure as defined in claim 2 wherein said tubular sleeve is constructed of plastic material and is provided with a flange at the inner end thereof for abuttingly engaging the inner surface of the brake shoe for limiting the insertion of the sleeve into the shoe.

4. The structure as defined in claim 3 wherein said warning device includes a warning light, a flasher associated with said light for causing the light to flash when energized to gain the attention of the operator of the equipment having the brake assembly associated therewith, said light and flasher being connected with a source of electrical potential through a switch for selective activation of the warning gauge, and a relay for maintaining the flasher and light energized after initial energization of the flasher and light by contact of the probe with a braking surface.

5. The structure as defined in claim 4 wherein the brake assembly is incorporated into a wheeled vehicle, the switch for selective energization of the electrical circuit including the ignition switch of the vehicle, said brake assembly being incorporated into the wheel assembly of the vehicle and the brake surface including the rotatable surface of a component of the brake assembly which rotates with the wheel.

6. The structure as defined in claim 5 wherein said relay and flasher are incorporated into a housing along with similar flashers and relays for each of the wheels of the vehicle, each of the flashers and relays including a warning light associated therewith, and a male-female plug assembly interconnecting the warning lights and the flashers to enable disconnection of a warning light after energization thereof to eliminate continuous flashing of the light.

7. The structure as defined in claim 6 wherein the external surface of said tubular sleeve is provided with spiral threads for screw-threaded engagement with the hole through the shoe for fixedly and releasably securing the sleeve in position to enable replacement of the probe when the brake linings are replaced, the internal projections on said sleeve being in the form of threads extending from end to end thereof, said hardenable conductive material also extending from end to end of the tubular sleeve and being fixedly retained therein by the threads on the interior surface of the sleeve, said screw-threaded fastener being of substantially less diameter than the internal diameter of the sleeve, said conductive material incorporating metallic solder therein having an internally screw-threaded socket communicating with the end of the sleeve having the flange thereon for receiving the screw-threaded fastener and securing the conductor to the end of the conductive material with the conductor being insulated from the shoe.

8. A brake lining wear gauge adapted to sense directly the wear of the brake lining below a selected thickness by an electrically conducting brake surface comprising a probe adapted to be attached to the brake lining support structure, said probe including an electrically conductive member and an electrically insulating sleeve attached to said member and separating said member from the brake lining support structure, the inner end of said member extending a selected distance into the underside of the brake lining and the inner end of said sleeve adapted to receive said member and the outer end of said sleeve terminating substantially flush with the outer end of said conductive member so that both the conductive member and sleeve extend substantially the same distance into the underside of the brake lining, said insulating sleeve being externally threaded and provided with a flange on the inner end thereof for screw-threaded engagement into an internally threaded hole in the brake lining support structure with the flange setting the distance that the sleeve and conductive member extend into the underside of the brake lining with the external threaded construction of the sleeve rigidly and detachably securing the probe to the brake lining support structure for replacement of the probe such as when replacing the brake lining, said conductive member being in the form of a hardenable conductive material, said sleeve having substantially the same diameter bore throughout the length thereof and provided with internal projections lockingly engaging with the conductive material when the conductive material is flowed into the interior of the sleeve and allowed to harden, a screw-threaded member extending into the conductive material from the end of the probe having the flange thereon for connecting an electrical conductor to the conductive material with the sleeve and flange insulating the conductive material from the brake lining support structure and insulating the fastener and conductor from the brake lining support structure.

* * * * *